J. & A. Fairley,
Hoe.
No. 110,126.
Patented Dec. 13, 1870.
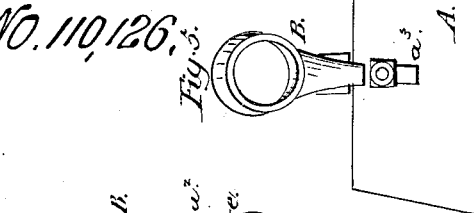
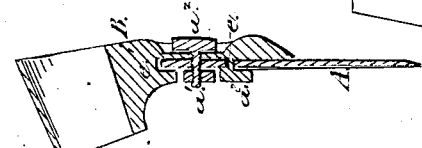
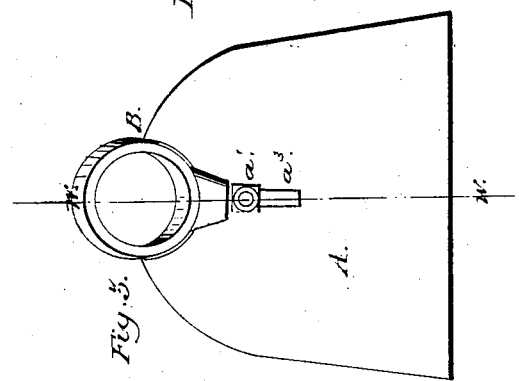
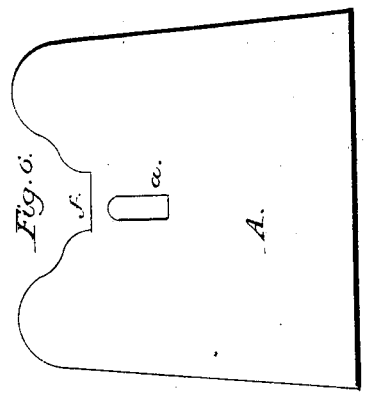
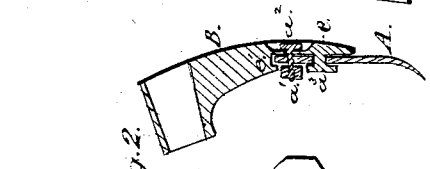
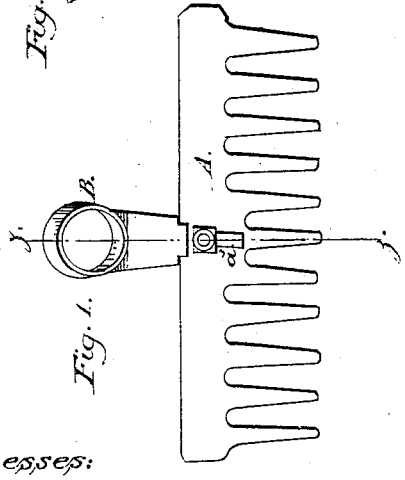
Witnesses:
E. A. Ellsworth
J. W. Mister
Inventors:
James Fairley
Alfred Fairley
per Munn & Co.
attorneys

United States Patent Office.

JAMES FAIRLEY AND ALFRED FAIRLEY, OF BIRMINGHAM, ENGLAND.

Letters Patent No. 110,126, dated December 13, 1870.

IMPROVEMENT IN HOES.

The Schedule referred to in these Letters Patent and making part of the same.

*To all whom it may concern:*

Be it known that we, JAMES FAIRLEY and ALFRED FAIRLEY, of Birmingham, England, have invented a new and useful Improvement in Plantation and other Hoes and other Farm Implements; and we do hereby declare that the following is a full, clear, and exact description thereof, which will enable those skilled in the art to make and use the same, reference being had to the accompanying drawing forming part of this specification.

This invention relates to a new and improved method of constructing the eyes or sockets of hoes, rakes, and other agricultural implements, and attaching the same thereto, whereby a hoe, rake, or other implement may be at any time easily detached from the socket and another substituted in the place thereof.

It consists in the manner of constructing the socket and in the manner of shaping and punching the blade of the implement, so that any blade so shaped and punched will fit, and may be at any time quickly secured to and detached from said socket.

In the accompanying drawing—

Figure 1 is a front view of our invention in one form, with a rake attached.

Figure 2 is a central vertical section of the same, taken in the line $y\ y$, fig. 1.

Figure 3 is a front view of the same form, with a hoe attached.

Figure 4 is a central vertical section of the same, taken in the line $w\ w$, fig. 3.

Figure 5 is a front view of the same, with a smaller hoe attached.

Figure 6 is a front view of the blade of a hoe, showing the form and manner of punching the same.

Similar letters of reference indicate corresponding parts.

A is the blade of the implement, and

B is the socket, made of wrought, cast, or other suitable iron.

The eye of the socket B is made of the same general form as the eyes of the sockets of hoes and other like agricultural implements, and receives the handle by means of which the hoe is operated, said eye having on the under side of the same, extending downward and being a part thereof or rigidly secured thereto, a bit to which the blade of the implement is secured, as hereinafter more fully set forth.

The bit of the socket may be made of any desired length, and having the requisite angle with relation to the handle and blade A.

The bit of the socket B is enlarged in the lower end of the same to present a greater bearing surface to the back of the blade of the implement, and also to receive, through a hole bored in the same, the screw-bolt $a^2$, countersunk in its back, said countersink being of sufficient depth to contain the head of the screw-bolt $a^2$, and of sufficient diameter to receive a wrench, by means of which the bolt $a^2$ is turned.

The front of the bit is depressed so as to form a plain face, against which the back of the blade of the implement is placed, and so as to leave a shoulder projecting in front.

Into said shoulder, and upward toward the eye of the socket, is a slot or mortise, $e'$, as shown in the drawing, fig. 2. This slot is in a line with the face of the bit, and receives the back of the blade A.

Upon the face of the bit, below the shoulder above described, is formed a tongue or tenon, $a^3$, adapted to fit into the slot $a$ formed in the blade A, shown in fig. 6.

Upon the under side of the tenon $a^3$ is a slot or mortise, $e$, to receive the blade A.

This mortise $e$ is similar to and in a line with the slot $e'$, so that the blade A, when placed upon the bit of the socket, may be forced up into the slots $e$ and $e'$, as shown, said slots $e$ and $e'$ being made slightly tapering on the front part, if necessary, to bind the blade A more firmly against the bit.

The tenon $a^3$ is of sufficient depth to project through the slot $a$ in the blade and beyond the same, so as to form another shoulder on its upper part, which, with the shoulder above described, forms a recess to receive the nut $a^1$ and prevent its turning with the bolt $a^2$.

The operation of attaching a blade A, whether a rake, or hoe, or other implement, to the socket is readily seen. The blade A is placed upon the face of the bit of the socket and the slot $a$ of the same upon the tenon $a^3$. The blade is then forced upward into the slots $e$ and $e'$, and the bolt $a^2$ passed through the hole in the bit above described, and through the slot $a$ of the blade, and turned into the nut $a^1$. The blade A is firmly held against the bit of the socket B, and by unscrewing the bolt $a^2$ the blade A is easily removed, when another of different form may be substituted therefor.

In order that the blades of implements may be made for sockets above described, it is only necessary that the top of the same should be provided with a neck, $f$, (see fig. 6,) in the center of the top of the same to receive the bit of the socket B, and that a slot, $a$, be punched near the top of the blade to receive the tenon $a^3$.

Constructed as above described, they form sockets for the attachment of the blades of implements employed in agriculture and for other purposes, the advantages of which are that the blades may at any time be removed from the sockets, or other blades of other forms substituted therefor.

Having thus described our invention,

What we claim as new, and desire to secure by Letters Patent, is—

1. A blade for hoes or other implements, having a nick, $f$, and slot $a$, in combination with a tenon, $a^3$, and slots $e\ e'$, on a socket, B, substantially as shown and described, for the purpose specified.

2. The socket B, when provided with a recessed and slotted bit, substantially as described, for the purpose specified.

In witness whereof, we, the said JAMES FAIRLEY and ALFRED FAIRLEY, have hereunto set our hands and seals this second day of November, in the year of our Lord one thousand eight hundred and sixty-seven.

JAMES FAIRLEY. [L. S.]
ALFRED FAIRLEY. [L. S.]

Witnesses:
  WILLIAM LOACH,
  HERBERT HESKEY,
    Clerks to James S. Cockings,
      Patent Agent, Birmingham.